Patented Oct. 3, 1933

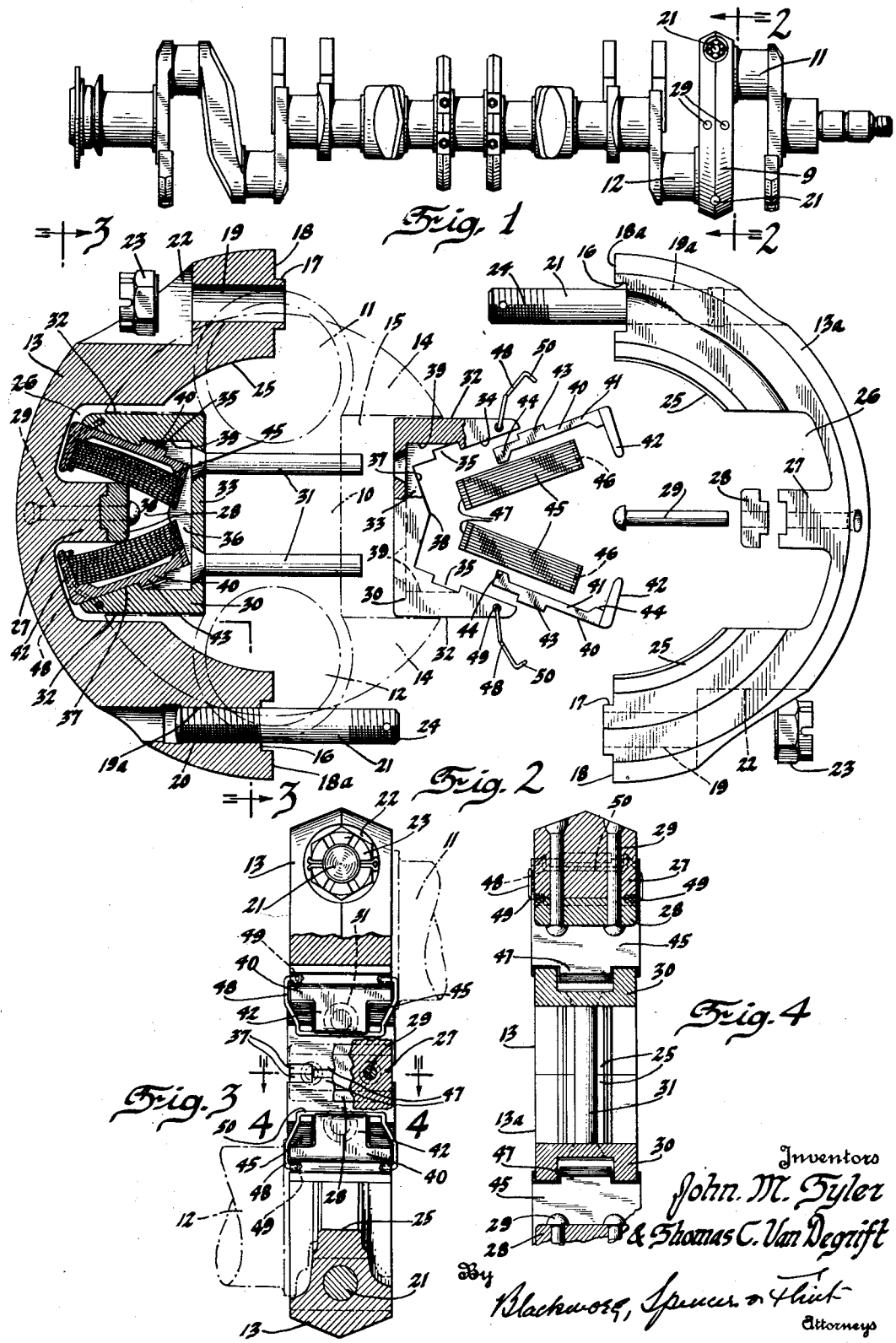

1,929,106

UNITED STATES PATENT OFFICE 1,929,106

VIBRATION ELIMINATOR

Thomas C. Van Degrift and John M. Tyler, Detroit, Mich., assignors to General Motors Research Corporation, Detroit, Mich., a corporation of Delaware Application March 27, 1931. Serial No. 525,828

10 Claims. (Cl. 74—6)

The invention herein disclosed and claimed relates to means for suppressing vibration, and particularly to balancers for dynamically suppressing torsional vibrations of engine or other crank shafts, subjected to forces that tend to twist them periodically.

Torsional vibration balancers adapted to be mounted elastically on the crank shafts of internal combustion engines are well known and widely used. In this invention there is realized a torsional vibration balancer susceptible of being attached to a crank shaft already in balance without disturbing the balance thereof; which does not require any elongation of the shaft to provide for its reception; which may be mounted on the crank shaft within the housing between the fly wheel and the front bearing; which may be fabricated conveniently by mass production methods and readily assembled and disassembled without the use of special tools.

The invention consists, specifically, of the combination of a crank shaft, with a ring-like inertia mass journaled concentrically with respect to the shaft axis and surrounding a crank arm connecting two crank pins; said inertia mass being composed of two semi-annular sections each carrying a spring abutment, adapted to be inserted by a radial movement, during the act of assembling, between pairs of outward diverging springs seated on other abutments mounted on the crank arm whereby the ring-like inertia mass may oscillate at a given frequency about the crank shaft axis in response to vibrations of the shaft.

In the accompanying drawing, wherein like reference characters indicate like parts throughout the several views, Fig. 1 represents an engine crank shaft provided with a balancer constructed according to this invention;

Fig. 2 is a view of the balancer parts showing one half in section with its component parts assembled and the other half mainly in elevation with elements separated;

Fig. 3 is an irregular section taken in planes indicated by the lines 3—3 in Fig. 2, and Fig. 4 is a section in a plane indicated by line 4—4 in Fig. 3.

The crank shaft shown in Fig. 1 is an eight throw shaft now in use in a motor car having an engine with eight cylinders in tandem or "in line" arrangement. The front end of the crank shaft shown is at the right and the rear end at the left of this view. It will be understood that the usual fly wheel (not shown) is to be attached to the rear end of the shaft and that the usual engine accessories are to be driven by the front end thereof. As an engine crank shaft is elastic and the inertia of the fly wheel tends to cause the shaft to rotate at even speed it will be apparent that the periodic forces due to the reciprocating pistons tend to twist the shaft periodically while the elasticity of the shaft tends to restore it to its normal condition between the thrusts of the pistons. When the periodic piston forces synchronize with the natural frequency of shaft vibration, as is well known, vibrations of considerable amplitude occur particularly at the front end of the shaft which drives the accessories, unless means for suppressing them are provided. It is not unusual, therefore, to apply vibration suppressing devices adjacent the front end of the shaft. The crank pins of a multicylinder engine are usually designated numerically according to their positions from front to rear, the front pin being designated crank pin No. 1, the next one in order, proceeding rearward, No. 2, and so on. In the embodiment chosen for illustration the balancer, indicated as a whole by numeral 9, is mounted concentrically of and balanced with respect to the shaft axis so as to oscillate in a plane normal thereto, on oppositely disposed bearing surfaces formed at the opposite ends of the double crank arm 10 which connects No. 1 and No. 2 crank pins, indicated respectively by the numerals 11 and 12. Preferably the double crank arm 10 and balancer 9 are substantially of equal thickness measured longitudinally of the crank shaft axis.

The vibratory mass of the balancer is composed of two substantially equal ring-like halves, 13 and 13a, meeting end to end to form a continuous balancer ring adapted to oscillate in bearings on the ends of the double crank arm 10. As shown by broken lines in Figs. 2 and 3 the double crank arm is integrally or otherwise rigidly connected at one end to the pin 11 and at the opposite end to the pin 12. Each end of said arm is grooved to form bearings and guides in which the balancer ring may oscillate in a plane normal to the crank shaft axis. The bottom and sides of said grooves are machined on circular lines concentric with the shaft axis, and the ends of the double crank arm may be expanded as shown to form two equal segments 14 with parallel chords as illustrated in Fig. 2, by broken lines thus providing opposed rectangular spaces 15, between the segmental ends.

The two semi-annular halves 13 and 13a of the balancer ring are substantially alike and may be wrought or cast in the same die or mold, or formed by the same automatic production machine. When assembled, however, the halves are reversed in position. Each half has a mortise or groove 16 formed in one end face and a tenon or tongue 17 formed on the other. When the two halves are reversed and assembled the tenon or tongue of each half fits into the mortise or groove of the other and the end faces 18, 18a meet in a common diametrical plane. Registering bolt holes 19, 19a normal to the faces 18, 18a are formed in the ring halves. Bolt holes 19a may be threaded to receive the threaded end 20 of a stud bolt 21. Bolt holes 19 communicate in each half ring with an external seating cavity 22 for receiving a lockable nut 23 screwed onto the threaded part 24 of the stud bolt. When the two ring halves are assembled they are secured rigidly one to the other by the said stud bolts and nuts.

The balancer ring composed of the two halves 13 and 13a is formed on the inner periphery with suitable curved bearing and guiding ribs or tongues 25 which ride in the bearing and guiding grooves previously described formed in the ends of the double crank arm 10 and segments 14 integral with said arm. The tongues or ribs 25 and the bearing grooves may be of any suitable cross-sectional contour to the other. The said bearing ribs or tongues correspond approximately in circumferential extent to the bearing and guiding grooves referred to. Between the ends of said ribs or tongues 25, as indicated at 26, the balancing ring is formed as if cut away interiorly to produce diametrically opposite spaces slightly wider than the spaces 15 in the double crank arm and registering symmetrically with said spaces. Projecting diametrically inward midway between the parallel sides of each of said spaces 26 is a spring abutment body 27 which carries on its inner end a hard bearing member 28, shown as secured by rivets 29 and a tongue and groove seat to give strength.

In order to aid in holding the springs which resist circumferential movement of the balancer ring with respect to the crank shaft and impart to it the required definite oscillation frequency, when forced to oscillate by torsional vibrations, which it must have to suppress in whole or in part the sensible vibrations to which the shaft may be subject, a spring seat holder 30 is riveted as by rivets 31, to each edge of double crank arm 10 as indicated in Fig. 2. Although these holders might be formed integral with the crank it is much more practical and convenient to fabricate them separately and secure them rigidly to said crank. Each holder may be made of general U-shape having two limbs 32 the outer surfaces of which are parallel and fit nicely in contact with the parallel sides of the spaces 15 between the segmental ends 14 of the crank arm 10. The bottom or cross member 33 of each U-shaped holder has a plane under surface seated upon the bottom of the space 15, the rivets 31 passing through this cross member 33. The inner faces of the outer parts of limbs 32 are substantially outward diverging plane surfaces 34 terminating inward at cross grooves 35, and continuing in the same plane, on the fore and aft sides, in spaced walls 36 until said surfaces meet, at right angles, other plane surfaces 37 in said walls which converge outward to the apices 38. Between the walls of each holder 36 is a rectangular space formed by the plane interior surface of the cross member 33, the inner faces of said walls 33 and parallel end surfaces 39 extending outward approximately to the outer sides of grooves 35. The conformation described of the U-shaped holder serves to position and rigidly back up the springs and spring seats to be presently described.

Two spring seats are provided for each spring seat holder, to be oppositely arranged on the holder, one on each side of abutment 27, 28, on the balancer ring. Each spring seat, indicated as an entirety by numeral 40, is composed of a main or body part 41, approximately as wide as the thickness of the crank arm 10 and balancer ring 13, 13a measured longitudinally of the crank shaft axis. A finger 42, narrower than the body part 41 projects at a right angle from the radially outer end of the latter. The rear side of the body part 41, that is the side that rests against the holder 30, is formed with a rib 43 adapted to seat in the groove 35 of the limbs 32 of said holder with the back of the seat in contact with the inclined surfaces described thus holding the seat from sliding outward or inward. Also, when the rib 43 is seated in said groove 35, the inner end of said seat rests upon the surfaces 37 of the spaced walls 36 of said holder. The inner face of the body part 41 is provided at opposite ends with elevated bearings 44 for opposite ends of the springs.

The springs that tend to hold the balancing ring immovable with respect to the crank shaft, but enable it to oscillate at a given frequency when rotarily displaced in response to vibrations of the crank shaft, are composed of flat plates of spring steel, each spring 45 consisting of a plurality of these plates assembled to form a "leaf" spring. Each flat spring plate or leaf may be of a width at least equal to the thickness of the balancer ring and has at one end a notch 46 and at the other end a corresponding tongue or projection 47. Notch 46 in the leaf spring receives the finger 42 of the spring seat, and tongue 47 of the spring enters between the walls 36 of the holder while the shoulders on each side of said tongue rest upon the inclined surfaces 37 of said walls, thus aiding assembling and preventing edgewise movement of the springs. A spring wire latch 48 in the form of a bail is pivoted by turned in ends 49 to opposite edges of each limb 32 of each holder 30. After the springs have been seated properly in the spring seats and the spring seats located as described in the holder, the loop 50 of the bail may be sprung over the end of finger 42 and caused to bear upon the upper end of the face of the spring upon which the abutment 28 is to bear.

It will be understood that the spring seats and springs will be assembled on the holders secured to the crank arm. The balancer ring halves are then forced radially to position with the abutment 27, 28 disposed between opposed springs and tightened and secured together by the nuts 23 and bolts 21. As the pairs of springs when assembled diverge outward from the center, the two halves of the ring may be easily positioned with the abutment member 27, 28 entered into the flaring opening between the springs which will be tensioned by setting up the nuts 23 on the bolts 21. When once the frequency of balancer ring necessary to balance out vibrations of a given shaft has been determined, suitable springs can be selected and the required set or preloading calculated or determined empirically. Thereafter the parts may be fabricated in quantities and assembled with reasonable assurance that each balancer will be properly attuned to the crank shaft on which it is assembled so that once the crank shaft is balanced no further balancing will be necessary after assembly therewith of the balancer, which is itself symmetrical and balanced with respect to its own axis.

While in accordance with the law a preferred embodiment of the invention has been illustrated and described in specific terms in such manner as to enable others to make and use the invention it is not intended that the protection sought shall be limited to the specific elements shown or that the terms of description shall be taken as terms of limitation, or that the scope of the invention shall be defined otherwise than by the appended claims.

We claim:

1. The combination of a shaft, a torsional vibration balancer ring journaled thereon concentric with the shaft axis, said balancer ring being composed of plural ring sections adapted to be assembled around the shaft, a pair of opposed leaf springs interposed between at least one section of the balancer ring and said shaft, said springs having their bearing surfaces diverging outward with respect to the shaft axis, and suitable spring abutments on balancer section and shaft, the abutment on the balancer section extending radially inward into contact with both springs, arranged to preload the springs by force applied in assembling the sections of the balancer ring.

2. A combination as defined in claim 1 in which the balancer ring is composed of two similar semi-annular sections provided with bolt holes and screw bolts adapted to draw and secure the sections together.

3. The combination of a crank shaft having plural crank pins, a double crank arm connecting two longitudinally adjacent pins, coaxially curved bearings on the ends of said double crank arm, a torsional vibration balancer ring journaled on said bearings, said balancer ring composed of two similar sections united substantially in a diametrical plane bisecting the crank arm longitudinally of said arm and shaft; opposed spring abutments on each side of said arm, a pair of leaf springs resting against said abutments on each side of said arm, said springs having bearing surfaces diverging with respect to the axis of the shaft and an abutment bearing projected radially inward from each section of the balancer ring between and in contact with each spring of the respective pairs.

4. A combination as defined in claim 3, in which there are two opposed pairs of spaced abutments arranged in planes diverging outward with respect to the shaft axis on each side of the crank arm, leaf springs having their ends supported by said pairs of abutments; and an abutment body on each section of the ring extending radially inward, said abutment body having opposite bearing surfaces engaging said springs between their ends on the side opposite that engaged by said pairs of abutments on the crank arm.

5. A combination as defined in claim 3 in which said opposed pairs of abutments located on the crank arm are formed in detachable spring seats.

6. A combination as defined in claim 3 in which the crank arm is provided with U-shaped holders, the limbs of which are provided on their inner sides with surfaces diverging outward with respect to the shaft axis, and detachable spring seats, each provided with spaced abutments, resting against said inclined surfaces on the limbs of the holder.

7. The combination of a shaft, a torsional vibration balancer ring composed of diametrically separable parts journaled concentrically on said shaft, a pair of opposed leaf springs, suitable spring abutments on balancer ring and shaft, and means for retaining a spring in place on the abutments including an elastic latch.

8. A combination as defined in claim 7 in which the latch consists of a pivotal spring bail adapted to be swung into position to engage a spring to hold it in place.

9. The combination of a shaft, a torsional vibration balancer journaled thereon, a pair of opposed spring seats detachably mounted on the shaft, each spring seat having spaced spring end bearing abutments, leaf springs seated against the abutments, each leaf spring having an end notch, means for retaining the spring seats, and means for retaining the springs on the seats including a finger on the spring seat engaging the notch in said spring.

10. A combination as defined in claim 9, including in addition a spring seat holder of U-shape having notches in its limbs, and spaced transverse walls between the limbs, said spring seat being provided with a rib engaging said notches and said spring having at the end opposite the notches a tongue engaged between said transverse walls.

THOMAS C. VAN DEGRIFT.
JOHN M. TYLER.